United States Patent [19]

Föhl

[11] 4,402,528
[45] Sep. 6, 1983

[54] DEFLECTION FITTING FOR A SAFETY BELT

[75] Inventor: Artur Föhl, Schorndorf, Fed. Rep. of Germany

[73] Assignee: REPA Feinstanzwerk GmbH, Alfdorf, Fed. Rep. of Germany

[21] Appl. No.: 274,866

[22] Filed: Jun. 18, 1981

[30] Foreign Application Priority Data

Jun. 20, 1980 [DE] Fed. Rep. of Germany ....... 3023093

[51] Int. Cl.³ ............................................. B60R 21/10
[52] U.S. Cl. .................................... 280/808; 297/483
[58] Field of Search ............... 280/808, 801, 803, 806; 297/483

[56] References Cited

U.S. PATENT DOCUMENTS 3,871,470 3/1975 Schwanz ............................ 280/806
3,877,114 4/1975 Silen ..................................... 280/808
4,311,323 1/1982 Provensal ............................ 280/801

FOREIGN PATENT DOCUMENTS 2428814 1/1976 Fed. Rep. of Germany ...... 280/808

Primary Examiner—Robert R. Song
Attorney, Agent, or Firm—Herbert L. Lerner; Laurence A. Greenberg

[57] ABSTRACT

Deflection fitting for a safety belt, especially for motor vehicles with a fitting plate which can swievel about a swivel axis. The fitting plate has a guide slot which is defined by a rounded deflection surface and lateral edge webs adjacent thereto. The guide slot is arranged asymmetrically to the swivel axis relative to its lengthwise dimension is concerned, and the swivel axis is arranged asymmetrically to the guide slot in the travel direction.

5 Claims, 3 Drawing Figures

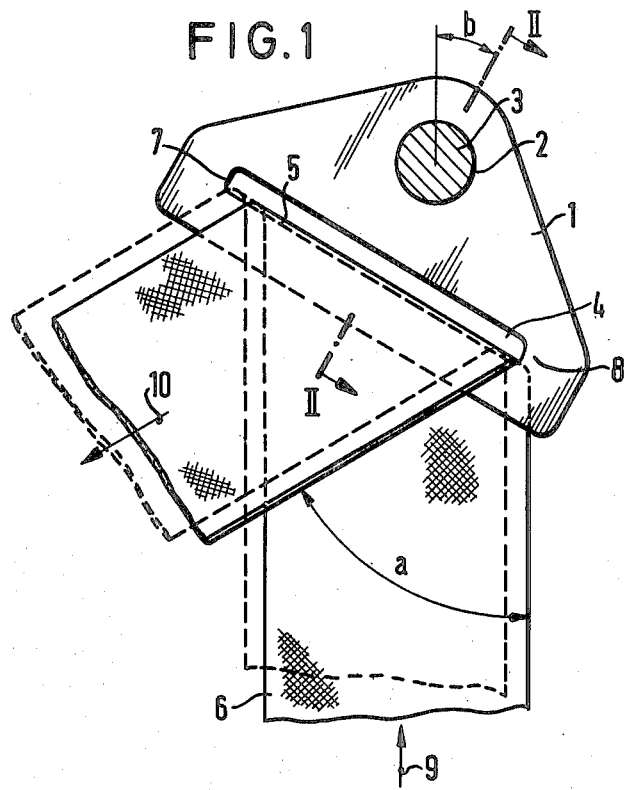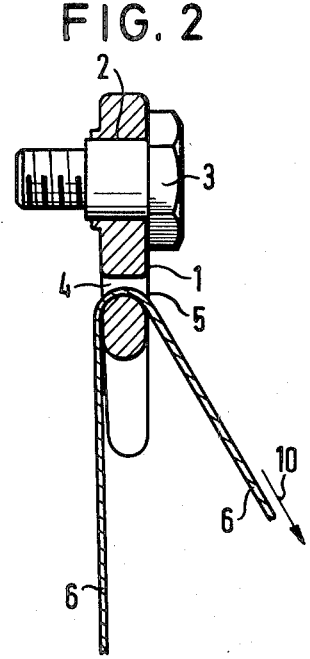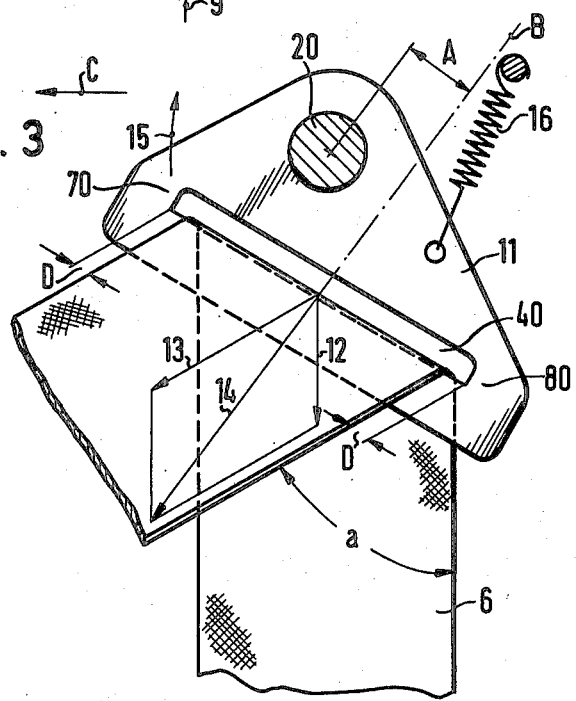

DEFLECTION FITTING FOR A SAFETY BELT

BACKGROUND OF THE INVENTION

1. Field of the Invention

The invention relates to a deflection fitting for a safety belt, especially for motor vehicles, with a fitting plate which can swivel about a swivel axis and which has a guide slot defined by a rounded deflection surface and lateral edge webs adjacent thereto, with the guide slot arranged asymmetrically to the swivel axis with regard to its lengthwise dimension.

2. Description of the Prior Art

The deflection fittings used in practice are designed to be symmetrical, with respect to the arrangement of the swivel axis, i.e. the support hole at which the fitting plate is fastened, for instance, to the frame of a motor vehicle in a rotatable manner, relative to the lengthwise dimension of the guide slot in which the safety belt runs, so that the deflection fittings can be used for right-hand and left-hand installations. When the belt is pulled out as well as during return of the belt, the fitting plate adjust itself at an angle which results in the following difficulties in practice: when the belt is pulled out, it runs in the travel direction upward along the guide slot and in this manner comes into contact with the lateral outer web, which defines the guide slot, of the fitting plate. Consequently, friction forces result which lead to heavy transversal stress of the belt and therefore to damage or wear thereof. A similar action happens upon return of the belt in the reverse manner on the opposite boundary of the guide slot. Not of least importance, the wearing comfort of the belt system is greatly impaired due to these friction forces, since according to these friction forces, the forces to be supplied for pulling-out and reeling-in the belt must be correspondingly large. If a load is applied to the system, i.e. in the case of a crash, a further disadvantage occurs in the case of symmetrical design, namely, that after the belt is blocked, a certain amount of pull-out of the belt takes place, in the process of which the heavily loaded belt is displaced laterally upward in the guide slot of the stationary fitting and is squeezed there, which can lead to a break of the belt in the case of very high loadings.

While it has been attempted to correct these disadvantages by an asymmetrical arrangement of the mounting hole, i.e. of the swivel axis relative to the longitudinal dimension of the guide slot (German Published Non-Prosecuted Application No. 24 28 814), the swivel axis in this known arrangement is arranged asymmetrically relative to the guide slot against the travel direction. Tests have shown that with normal handling and in particular in case of a crash load, the belt has a tendency even more than with a symmetrical arrangement to run up on a confining edge, i.e. on the edge web of the fitting plate, so that this design turned out to be unusable and has not found practical application.

SUMMARY OF THE INVENTION

It is an object of the invention to provide a deflection fitting of the type mentioned at the outset, wherein when subjected to normal use of deflecting a belt as well as to subjecting the belt to an extreme load, the belt is always guided substantially centered in the guide slot and spaced a distance from the lateral edge webs. Thereby the belt is not stressed transversely.

With the foregoing and other objects in view, there is provided in accordance with the invention a deflection fitting for a safety belt, especially for motor vehicles, for deflecting the belt, the deflection fitting comprising a fitting plate which can swivel about a swivel axis and which has an elongated guide slot through which the safety belt is passed, said guide slot defined by a rounded deflection surface and lateral edge webs adjacent thereto, said guide slot arranged asymmetrically to the swivel axis relative to the slot's lengthwise dimension and with the swivel axis arranged asymmetrically to the guide slot in the travel direction.

Other features which are considered as characteristic for the invention are set forth in the appended claims.

Although the invention is illustrated and described herein as embodied in a deflection fitting for a safety belt, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which FIGS. 1 and 2 show a top view as well as a cross-sectional side view of a known deflection fitting with the symmetrical arrangement of the guide slot and the swivel axis, and FIG. 3 shows the front view of the deflection fitting according to the invention with an asymmetrical arrangement of the guide slot and the swivel axis.

DETAILED DESCRIPTION OF THE INVENTION

The deflection fitting of the invention has a fitting plate which can swivel about a swivel axis and has a guide slot defined by a rounded deflection surface and lateral edge webs adjacent thereto. The guide slot is arranged asymmetrically to the swivel axis relative to its lengthwise dimension and the swivel axis (mounting hole 20) is arranged asymmetrically to the guide slot (4) in the travel direction (C). Due to the special asymmetrical arrangement of the guide slot and the swivel axis, a rotation of the fitting plate adjusts itself in accordance with the prevailing torque which brings about a state of equilibrium in such a manner that the centered symmetrical position of the belt in the guide slot is preserved, and safety margins remain between the edges of the belt and the edge webs, so that there is no detrimental contact. This means the belt is not displaced in the direction toward an edge web and squeezed against the latter. Because there are no friction forces, the force to be supplied when the belt is pulled out is substantially smaller than in the case when lateral friction forces are present in addition to the normal deflection friction.

In order to reliably prevent, when the belt is removed, i.e. when it is wound-up on an automatic winder, rubbing of the belt edge in the last phase of rolling-up, against the opposite edge web, means are provided, according to further embodiments of the invention, by which the fitting plate, when relieved of a pulling force, is moved into a position in which the guide slot is essentially horizontal. This can be achieved by an appropriate arrangement of the center of gravity of the fitting plate, i.e. its center of gravity is located at least approximately on a connecting line which goes through the swivel axis and is perpendicular to the lengthwise dimension of the guide slot and/or by providing a return spring, i.e. the fitting plate is engaged by a return spring which moves the mechanically unloaded fitting plate into a swivel position in which the guide slot is at least approximately horizontal. The invention will be explained in the following by means of an embodiment example shown in the drawing.

In the known deflection fitting according to FIGS. 1 and 2, an approximately triangular or chain link-shaped fitting plate 1 has a mounting hole 2 which forms a swivel axis for the fitting plate 1. A screw 3 is inserted into mounting hole as the pivot shaft, and by means of screw 3 the fitting plate 1 is fastened, for instance, to the vertical frame strut of a motor vehicle so that it can swivel. In an arrangement symmetrical relative to the center axis of the fitting plate 1 going through the mounting hole 2, an elongated guide slot 4 is provided in the fitting plate 1. In the Figures, the lower long edge of guide slot 4 forms a rounded deflection surface 5 for the flexible belt 6 of a safety belt. The guide slot 4 is bounded laterally by two edge webs 7 and 8. The belt 6 comes from the direction 9, for instance, from an automatic roll-up device and leaves the guide slot 4 of the fitting plate 1 at the angle a (direction 10). In the process, the fitting plate 1 is moved by an angle b, which is one-half of the angle a, in the direction 10. The outgoing section of the belt 6 goes to the shoulder of the person to be protected. In the position shown by solid lines, the belt 6 is in the lowest position due to the action of the return spring, for instance, of the automatic roll-up device and runs here onto the edge web 8. This position of the belt 6 is retained during the return of the belt. When the belt 6 is pulled out, it is shifted in FIG. 1 to the top left along the guide slot 4 until it makes contact with the edge web 7. In FIG. 1, this position of the belt 6 is indicated by dashed lines. This position of the belt is always retained during the pulling-out, i.e. the belt 6 rubs laterally against the edge web 7. In the case of a load, i.e. for instance in the event of a crash, the fitting plate 1 remains in place and the belt is displaced even more in the direction of the edge web 7, so that a large transversal stress occurs at this boundary edge of the belt 6.

The deflection fitting shown in FIG. 3 is of a design similar to that of FIGS. 1 and 2 with the exception that the swivel axis, i.e. the mounting hole 20 is shifted by the amount A relative to the central axis B of the guide slot 40, which axis goes through the guide slot 40, in the travel direction C and is therefore arranged asymmetrically relative to the guide slot. The fitting plate itself is of similar asymmetrical design. In FIG. 3, the forces which become active at the fitting plate 11 are shown in a force parallelogram. The force 12 acts vertically downward and the force 13 acts in the direction of the outgoing belt section, i.e. in the direction 10 according to FIGS. 1 and 2. From the force triangle there is obtained a resultant force 14, the action line B of which runs at a distance A from the swivel axis or the mounting hole 20. When the belt 6 is pulled out, a rotation of the fitting plate 11 in the direction 15 thus adjusts itself according to the prevailing force moment, which brings about a state of equilibrium in such manner that the belt 6 during its withdrawal runs at a predetermined safety margin D from the lateral edge web 70. The amount A, i.e. the asymmetrical offset of the swivel axis from the guide slot 40, is advantageously chosen so that upon maximum swivel deflection according to the angle a, the belt 6 retains this safety margin D. In the event of a crash it may happen that the belt 6 will tend to swing away toward the edge web 70; however, the above-mentioned safety margin D is preserved since the fitting plate 11 can immediately swing further out.

In order to prevent contact of the belt 6 with the lateral edge web 80 upon removing the safety belt, i.e. upon winding-up the belt, for instance, on an automatic wind-up device, means are provided by which the fitting plate, if it is mechanically relieved, is automatically moved so that the guide slot 40 is essentially horizontal. In the embodiment example, this is accomplished by a return spring 16 which is fastened on the one side to the lever arm of the fitting plate 11 which is longer with respect to the swivel axis 20, and on the other side, is fixed to the motor vehicle frame. This return spring 16 exerts, when the safety belt is removed, a torque on the fitting plate 11 which attempts to bring the fitting plate 11 into a position in which the guide slot 40 is essentially horizontal. In this manner, the safety margin D between the belt 6 and the edge web 80 is always maintained and friction does not take place.

I claim:

1. Deflection fitting for a safety belt which may be pulled out as well as returned to a roll-up device, especially for motor vehicles, for deflecting the belt, the deflection fitting comprising a fitting plate which can swivel about a swivel axis and which has an elongated guide slot through which the safety belt is passed and pulled out from the slot in a travel direction which is at an angle to either side of a plane midway to and perpendicular to the slots' lengthwise dimension, said guide slot defined by a rounded deflection surface and lateral edge webs adjacent thereto, said guide slot arranged asymmetrically to the swivel axis relative to the slot's lengthwise dimension and with the swivel axis arranged asymmetrically to the guide slot on the same side of the perpendicular plane as the travel direction.

2. Deflection fitting according to claim 1, wherein the fitting plate has its center of gravity located at least approximately at a point on a connecting line which goes through the swivel axis and is perpendicular to the lengthwise dimension of the guide slot.

3. Deflection fitting according to claim 1, wherein the fitting plate is engaged by a return spring which moves the fitting plate when mechanically unloaded into a swivel position in which the guide slot is at least approximately horizontal.

4. Deflection fitting according to claim 1 or claim 2, wherein a safety margin is provided between the lateral belt boundaries and the lateral edge webs of the fitting plate.

5. Deflection fitting for a safety belt which may be pulled out as well as returned to a roll-up device, especially for motor vehicles, for deflecting the belt, the deflection fitting comprising a fitting plate which can swivel about a swivel axis and which has an elongated guide slot through which the safety belt is passed and pulled out from the slot in a travel direction which is at an angle to either side of a plane midway to and perpendicular to the slot's lengthwise dimension, said guide slot defined by a rounded deflection surface and lateral edge webs adjacent thereto, said guide slot arranged asymmetrically to the swivel axis relative to the slot's lengthwise dimension and with the swivel axis arranged asymmetrically to the guide slot on the same side of the perpendicular plane as the travel direction, wherein the fitting plate has its center of gravity located at least approximately at a point on a connecting line which goes through the swivel axis and is perpendicular to the lengthwise dimension of the guide slot, wherein the fitting plate is engaged by a return spring which moves the fitting plate when mechanically unloaded into a swivel position in which the guide slot is at least approximately horizontal.

* * * * *